United States Patent
Desargant et al.

(10) Patent No.: US 6,512,486 B1
(45) Date of Patent: Jan. 28, 2003

(54) MONOPULSE BEAM POINTING SYSTEM FOR A SATELLITE COMMUNICATION SYSTEM

(75) Inventors: Glenn Joseph Desargant, Fullerton, CA (US); Albert Louis Bien, Anaheim, CA (US); Orville Lorenson Reid, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/974,071

(22) Filed: Oct. 9, 2001

(51) Int. Cl.$^7$ ................................................. H01Q 19/14
(52) U.S. Cl. ....................... 343/781 CA; 343/700 MS; 343/840
(58) Field of Search .................... 343/781 CA, 700 MS, 343/840, 781 P, 895; H01Q 19/14

(56) References Cited

U.S. PATENT DOCUMENTS

| | | | | |
|---|---|---|---|---|
| 4,305,075 A | * | 12/1981 | Salvat et al. | 343/761 |
| 5,767,804 A | * | 6/1998 | Murphy | 342/357 |
| 6,295,034 B1 | * | 9/2001 | Brown et al. | 343/781 CA |

* cited by examiner

Primary Examiner—Hoanganh Le
(74) Attorney, Agent, or Firm—Harness Dickey & Pierce P.L.C.

(57) ABSTRACT

An improved method is provided for pointing an antenna subsystem residing on a mobile platform towards a satellite in a satellite communication system. The improved method includes: transmitting a tone signal from the satellite; receiving the tone signal at the antenna subsystem; determining position of the mobile platform in relation to the satellite a monopulse tracking technique, where the position of the satellite is based on the tone signal received at the antenna subsystem; and pointing the antenna subsystem towards the satellite.

11 Claims, 8 Drawing Sheets

MONOPULSE BEAM POINTING SYSTEM FOR A SATELLITE COMMUNICATION SYSTEM

TECHNICAL FIELD

The present invention relates generally to satellite communication systems, and more particularly to an improved method for pointing an antenna subsystem associated with a moving platform towards a satellite in a satellite communication system.

BACKGROUND OF THE INVENTION

Broadband data and video services, on which our society and economy have grown to depend, have heretofore generally not been readily available to users onboard mobile network platforms such as cars, buses, boats, trains, airplanes, etc. While the technology exists to deliver such services to most forms of mobile network platforms, past solutions have been generally quite expensive, with low data rates and/or available to only very limited markets of government/military users and some high-end maritime markets (i.e., cruise ships).

Satellite communication systems are commonly used to provide broadband data services to mobile network platforms. One obstacle in such communication systems is accurately pointing the antenna system residing on a moving platform towards a stationary satellite without degrading the performance of the communication link.

It is, therefore, a principal object of the present invention to provide a method for accurately pointing an antenna subsystem on a moving platform towards a satellite without degrading the performance of the communication link.

SUMMARY OF THE INVENTION

In accordance with the present invention, an improved method is provided for pointing an antenna subsystem residing on a mobile platform towards a satellite in a satellite communication system. The improved method includes: transmitting a tone signal from the satellite; receiving the tone signal at the antenna subsystem; determining position of the mobile platform in relation to the satellite a monopulse tracking technique, where the position of the satellite is based on the tone signal received at the antenna subsystem; and pointing the antenna subsystem towards the satellite.

In another aspect of the present invention, a reflector antenna subsystem is adapted to receive a monopulse tracking signal. The reflector antenna subsystem includes: a primary reflector; a feed device disposed on a surface of the primary reflector; a sub-reflector coupled by one or more support arms to the primary reflector, such that the subreflector is suspended above the feed device; and a second antenna disposed on an outwardly facing surface of the sub-reflector, thereby orientated to receive the monopulse tracking signal.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
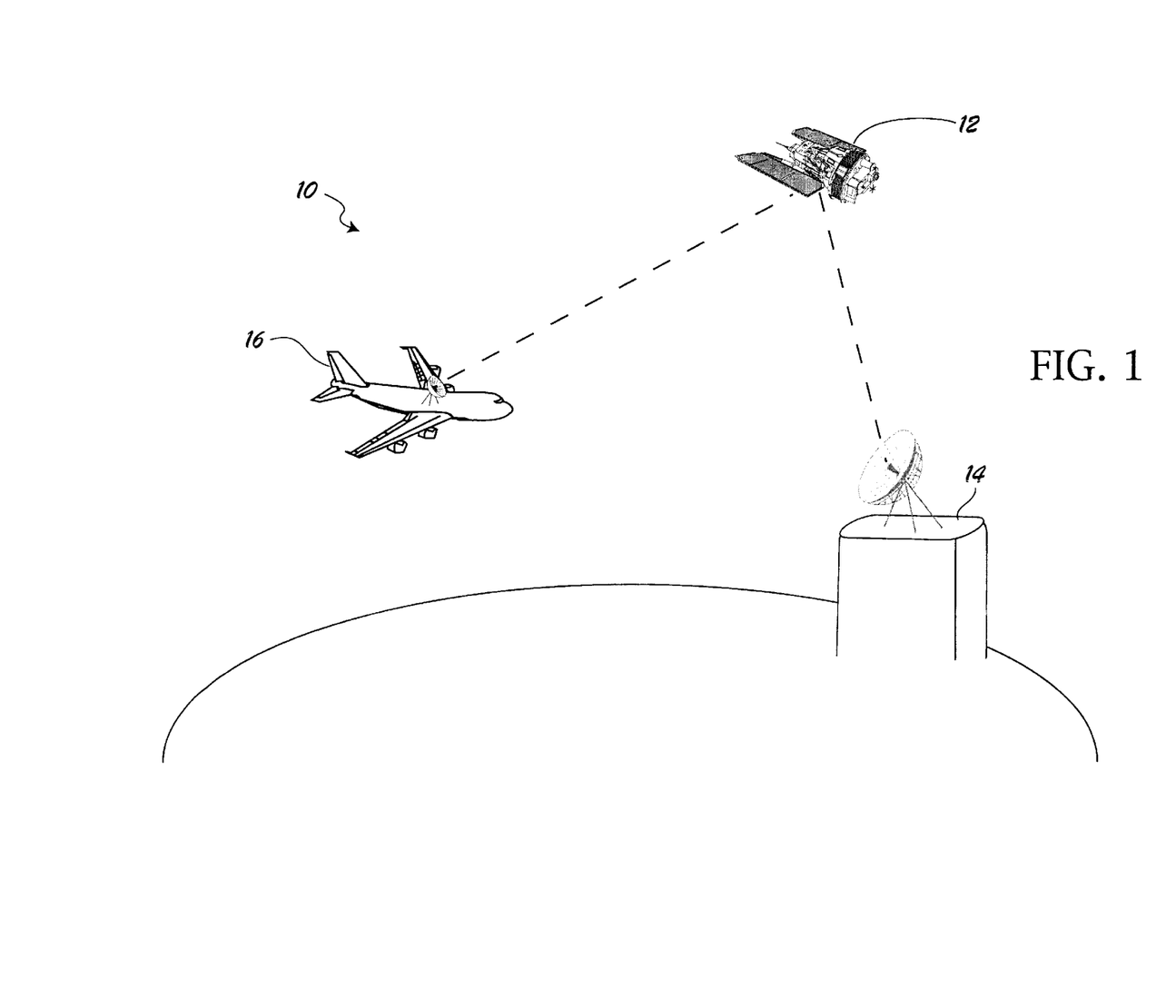
FIG. 1 is a diagram illustrating an exemplary satellite communication system in accordance with the present invention.

An exemplary satellite communication system 10 is depicted in FIG. 1. The satellite communication system 10 includes a geosynchronous orbiting satellite 12 in data communication with one or more earth terminals 14. Information is typically uplinked from a first earth terminal 14 to the satellite 12 which in turn downlinks the information to a second earth terminal 14. Although a geosynchronous orbiting satellite is presently preferred, this is not a limitation on the broader aspects of the present invention. On the contrary, the improved beam pointing method may also be applicable to low-earth orbiting satellites, mid-earth orbiting satellites, and other non-stationary orbiting satellites.

Although an earth terminal is generally stationary in relation to the orbiting satellite, it is envisioned that the satellite may also be in data communication with a terminal that is moving on or near the surface of the Earth. For instance, the satellite 12 may be in two-way communication with an airplane 16 which is acting as an earth terminal. It is to be understood that the airplane is equipped with an antenna subsystem 18 for sending and receiving communication signals to and from the satellite 12 as is well known in the art. The satellite may in turn downlink to the communication signals from the airplane to another earth terminal. While the following description is provided with reference to an airplane, it is envisioned that the present invention is applicable to other types of moving platforms (i.e., cars, buses, boats, trains, etc.).

In accordance with the present invention, an improved method is provided for pointing an antenna subsystem on a moving platform towards a satellite in a satellite communication system. Unlike a stationary earth terminal, the position of an in-flight airplane changes in relation to the position of the satellite. Therefore, a monopulse tracking technique is proposed for determining the position of the airplane in relation to the satellite. In this way, the antenna subsystem associated with the airplane can be continually pointed towards the satellite, thereby enabling uninterrupted data communication between the airplane and the satellite.

Figure 2:
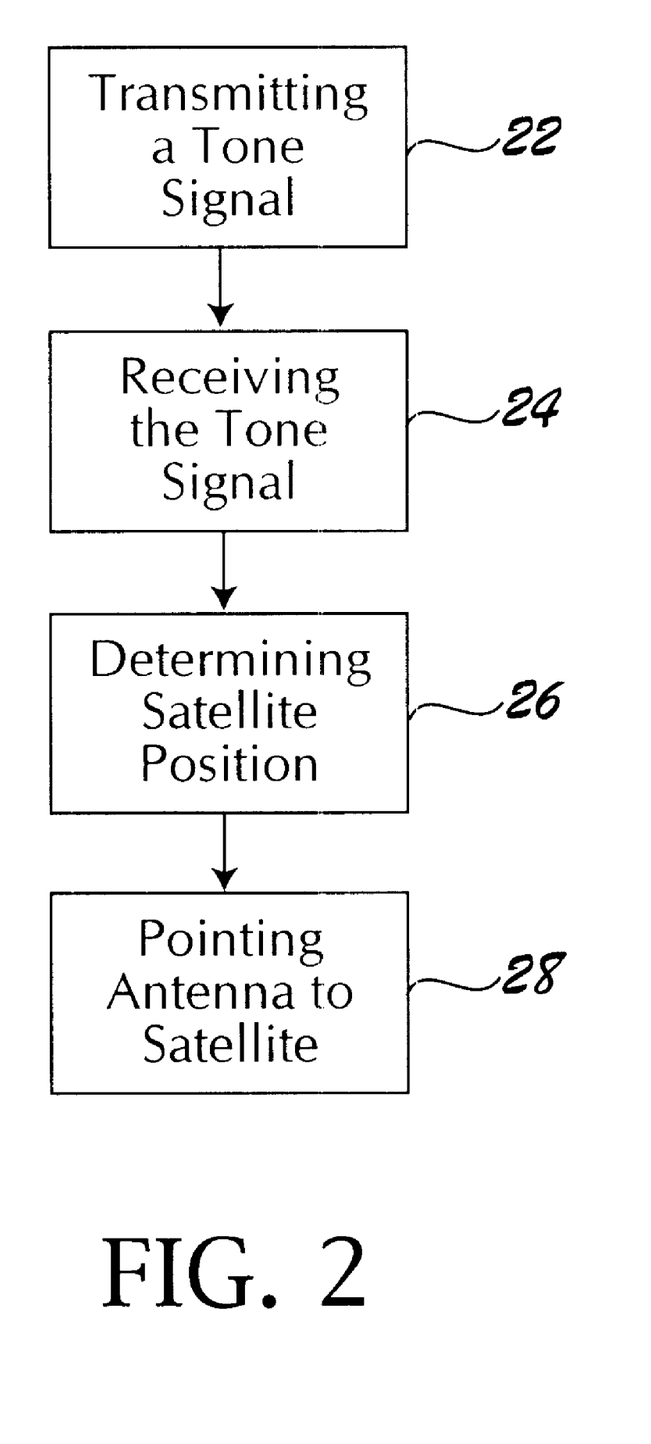
FIG. 2 is a flowchart illustrating an improved method for pointing an antenna subsystem on a moving platform towards a satellite.
Figure 3:
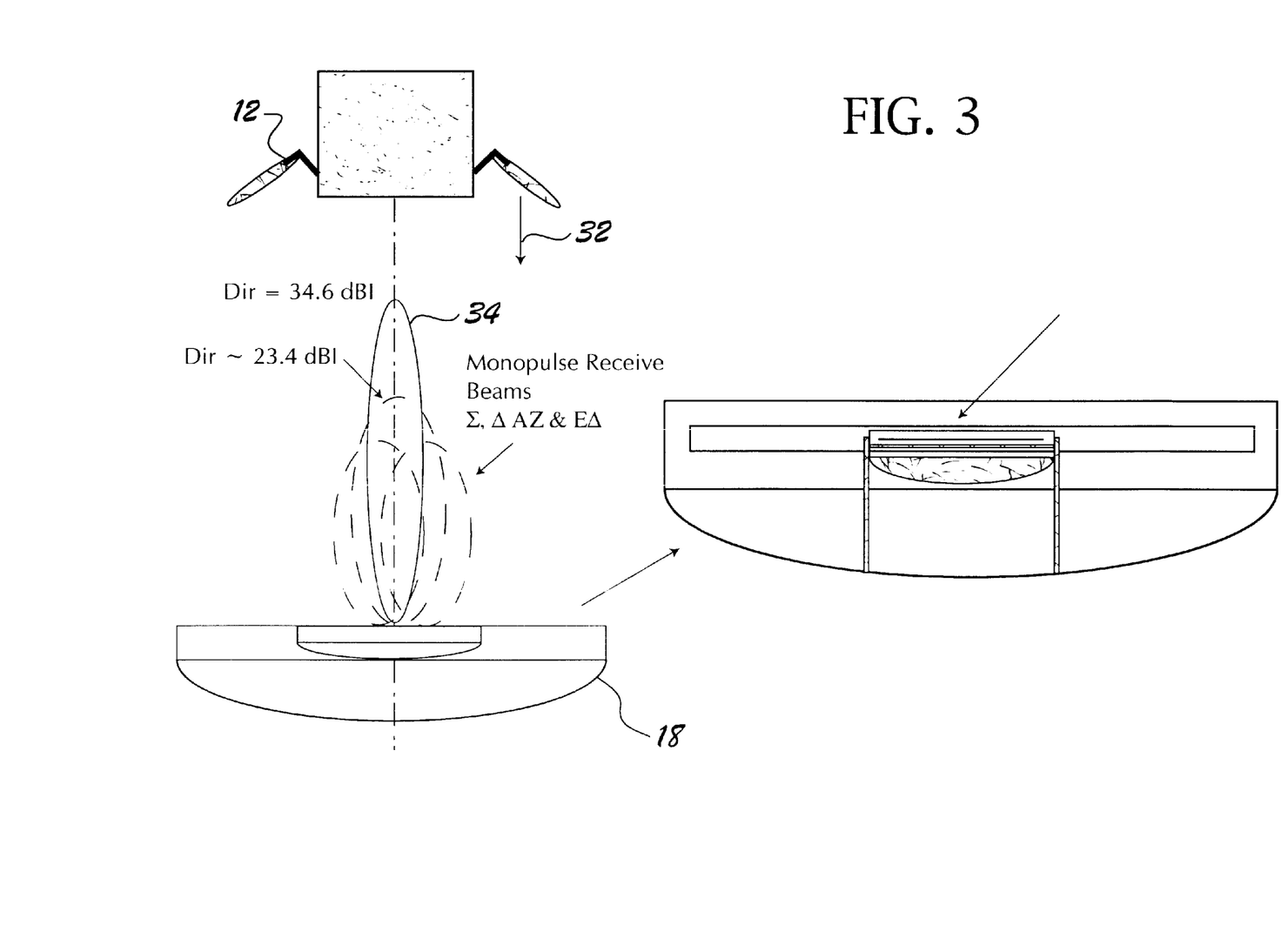
FIG. 3 is a diagram illustrating a tone signal in relation to a communication signal in the context of the satellite communication system of the present invention.

Referring to FIG. 2, a tone signal (also referred to as a beacon signal) is transmitted from the satellite 22 in order to track the position of the satellite in relation to the airplane. The tone signal is in turn received by the antenna subsystem 24 residing on the airplane. A monopulse tracking technique as is well known in the art is used to determine the position of the airplane 26 in relation to the satellite. More specifically, the tone signal received by the antenna subsystem is used to determine the position of the satellite. Positional information for the satellite is then used to point the antenna subsystem towards the satellite 28 for subsequent data communication between the airplane and the satellite. In other words, the tone signal is used as a monopulse tracking signal for positioning the antenna subsystem towards the satellite. It should be noted that the tone signal 32 transmitted from the satellite 12 is different than the communication beam 34 transmitted between the satellite 12 and the antenna subsystem 18 as shown in FIG. 3.

Figure 4:
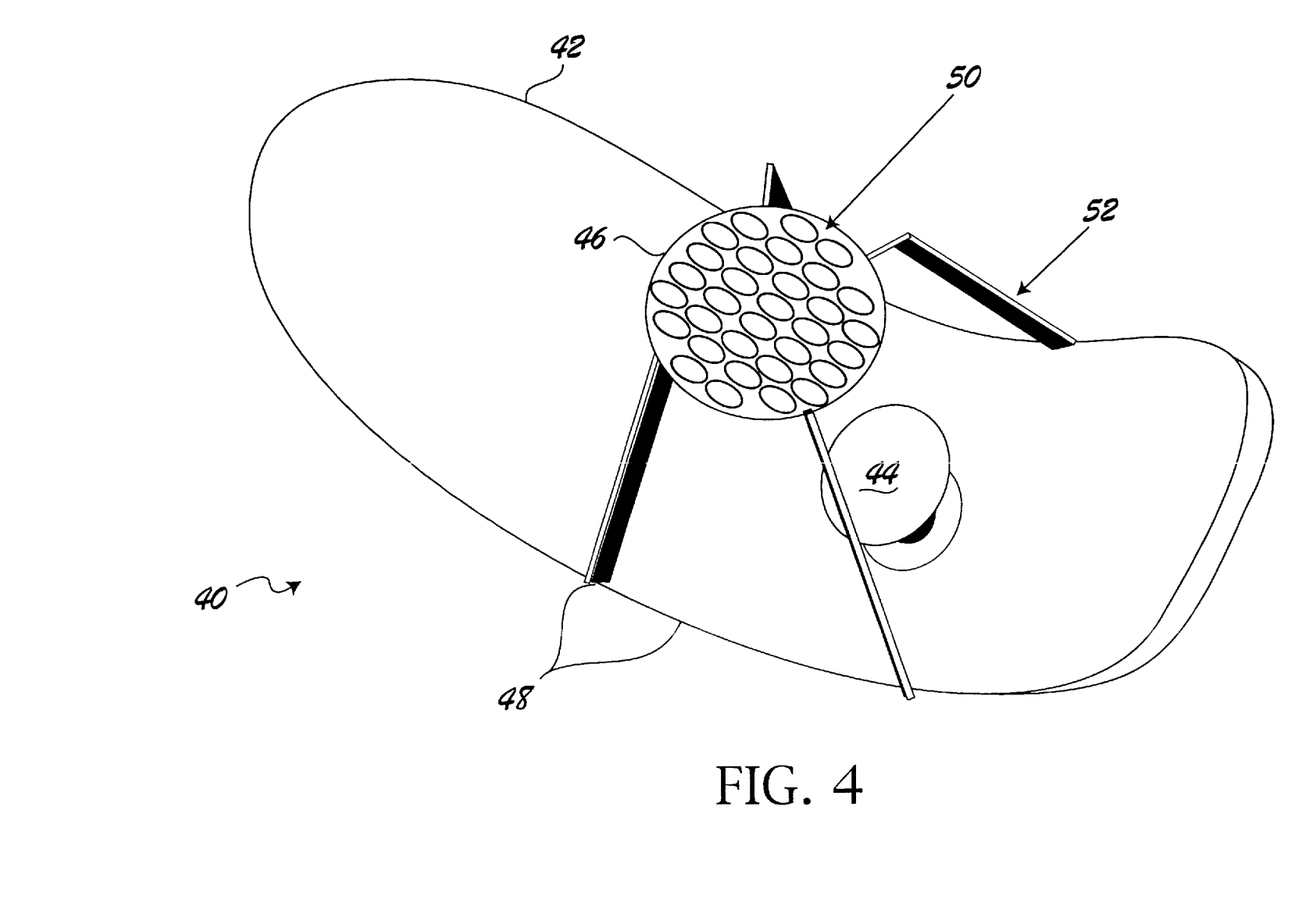
FIG. 4 depicts an elliptical reflector antenna system having a patch array antenna disposed on the back of the sub-reflector in accordance with the present invention.

FIG. 4 illustrates an elliptical reflector antenna system 40 that may serve as the antenna subsystem residing on the airplane. As will be apparent to one skilled in the art, the elliptical reflector antenna system 40 generally includes a primary elliptical reflector 42, a feed device 44 and a sub-reflector 46. The feed device 44 is disposed at a central location on the surface of the primary elliptical reflector 42. The sub-reflector 46 is coupled by one or more support arms 48 to the primary reflector 42, such that the sub-reflector 46 is suspended above the feed device 44. Although an elliptical reflector antenna is presently preferred, it is envisioned that other types of reflector antennas are also within the scope of the present invention.

In another aspect of the present invention, the elliptical reflector antenna system 40 is further adapted to accommodate the above-described beam pointing technique. Specifically, a second antenna 50 is mounted on an outwardly facing surface of the sub-reflector 46 as shown in FIG. 4. Cables 52 connecting the second antenna 50 to an antenna control unit (not shown) are preferably embedded in the support arms 48 for the sub-reflector 46. The second antenna 50 is thereby orientated to receive the tone signal from the satellite. In this way, monopulse tracking based on the tone signal can be achieved without impacting the performance of the elliptical reflector antenna system 40.

Figure 5A:
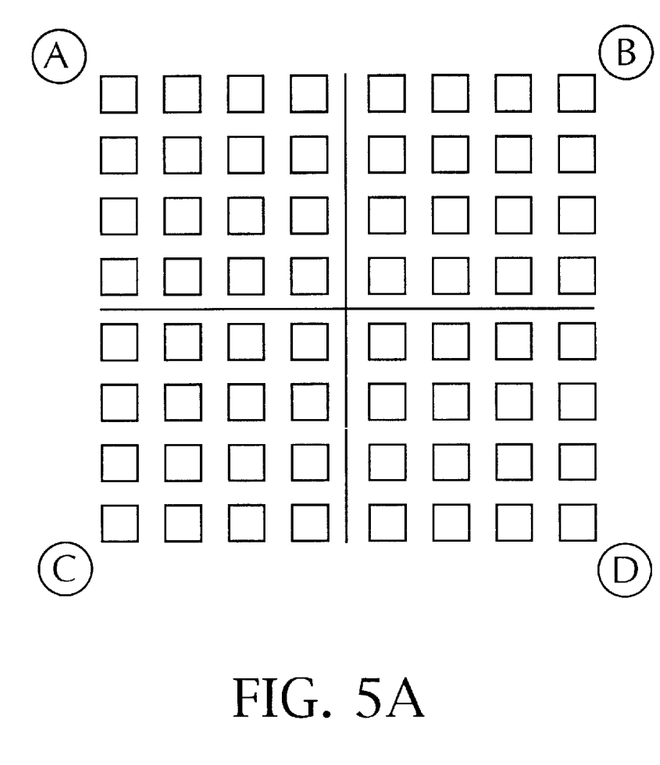
FIGS. 5A and 5B illustrate partitioning of the patches in the patch array antenna and an exemplary monopulse feed-bridge connection for the patch array antenna, respectively, in accordance with the present invention.
Figure 5B:
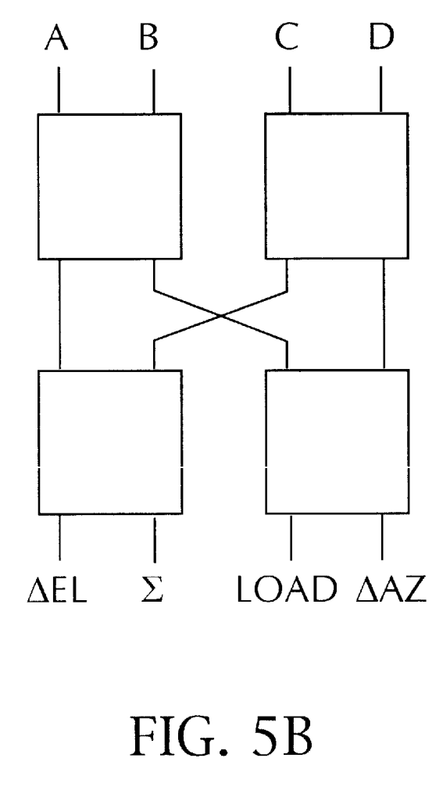
Figure 6A:
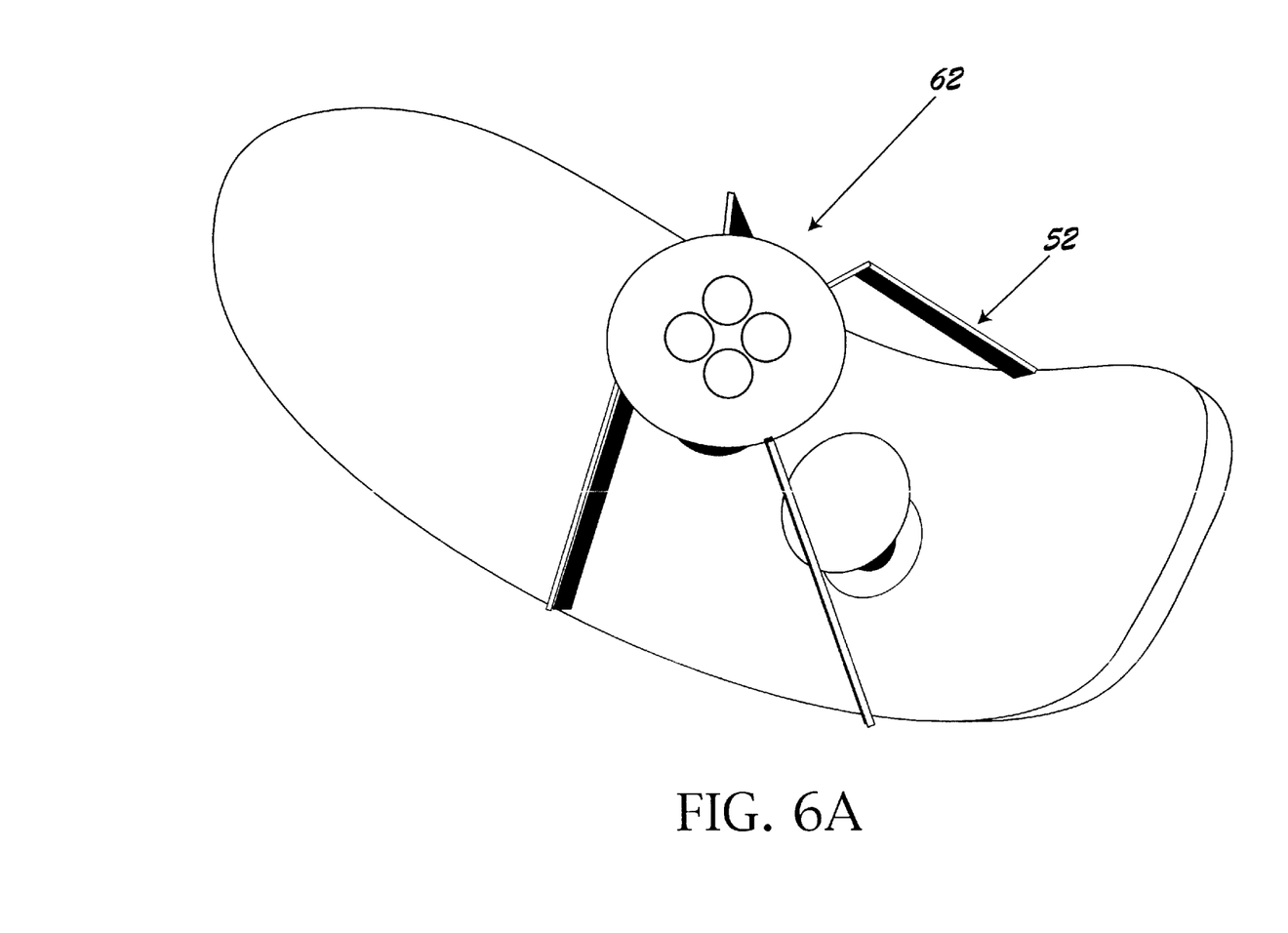
FIGS. 6A–6C depict an elliptical reflector antenna system having a four-patch antenna, a four-arm spiral antenna, and a waveguide array antenna, respectively, disposed on the back of the sub-reflector in accordance with the present invention.
Figure 6B:
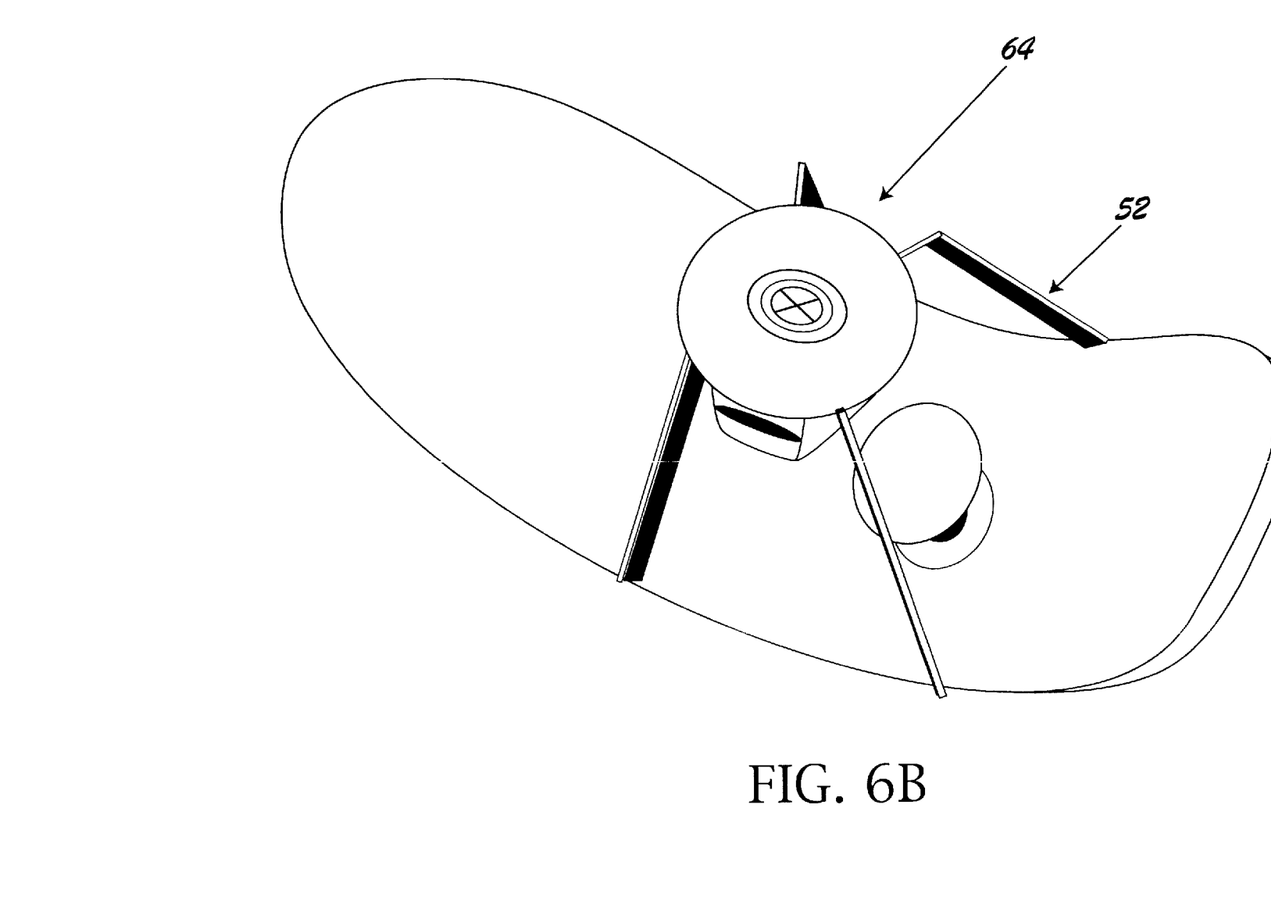
Figure 6C:
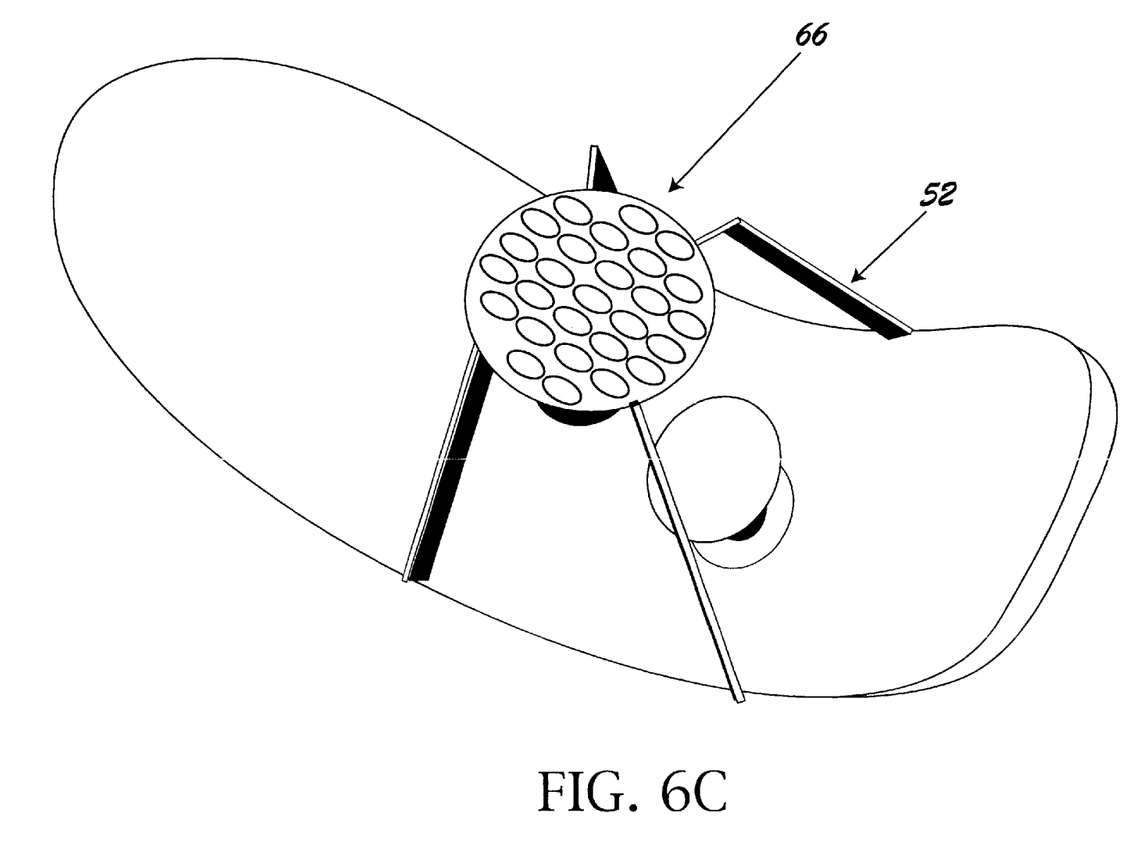

The second antenna 50 is preferably a patch array antenna as shown in FIG. 4. Referring to FIG. 5A, monopulse tracking is achieved by splitting the patches into four quadrants as is well known in the art. A corresponding monopulse feedbridge connection 56 for the patch array antenna 50 is shown in FIG. 5B. It is envisioned that the monopulse feedbridge connection may also disposed on the back surface of the sub-reflector 46. Although the patch array antenna is presently preferred, it is envisioned that other types of antennas are also within the scope of the present invention. For instance, a four-patch antenna 62, a four-arm spiral antenna 64, and a waveguide array antenna 66 may also be used as the second antenna disposed on the back of the sub-reflector as shown in FIGS. 6A, 6B, and 6C, respectively.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A method for pointing an antenna subsystem towards a satellite in a satellite communication system, comprising:

transmitting a tone signal from the satellite;

receiving the tone signal at the antenna subsystem, the antenna subsystem residing on a mobile platform;

determining position of the satellite in relation to the antenna subsystem using a monopulse tracking technique, where the position of the satellite is based on the tone signal received at the antenna subsystem; and pointing the antenna subsystem towards the satellite.

2. The method of claim 1 wherein the step of transmitting a tone signal further comprises transmitting the tone signal in a monopulse receive beam that is different than the communication beam transmitted to and from the satellite.

3. The method of claim 1 wherein the step of receiving the tone signal at the antenna subsystem further comprises using a reflector antenna system to receive the tone signal, the reflector antenna system having a primary reflector, a sub-reflector, and a feed device.

4. The method of claim 3 wherein the step of receiving the tone signal at the antenna subsystem further comprises receiving the tone signal using an antenna disposed on an outwardly facing surface of the sub-reflector.

5. The method of claim 4 wherein the antenna is selected from the group comprising a spiral antenna, a patch array antenna, and a waveguide array antenna.

6. A satellite communication system, comprising:

a satellite operable to transmit a tone signal; and a mobile platform in data communication with the satellite, the mobile platform having an antenna subsystem for transmitting and receiving communication signals to and from the satellite;

said antenna subsystem operable to determine position data of the mobile platform in relation to the satellite using a monopulse tracking technique and to point the antenna subsystem towards the satellite based on the position data, where the position of the satellite is based on the tone signal received at the antenna subsystem.

7. The satellite communication system of claim 6 wherein the antenna subsystem is adapted to receive the tone signal in a monopulse receive beam that is independent from a communication beam used to transmit the communications signals to and from the satellite.

8. The satellite communication system of claim 6 wherein the antenna subsystem includes a reflector antenna having a primary reflector, a sub-reflector, and a feed device.

9. The satellite communication system of claim 8 wherein the reflector antenna further includes a second antenna disposed on an outwardly facing surface of the sub-reflector.

10. The satellite communication system of claim 9 wherein the second antenna is selected from the group comprising a spiral antenna, a patch array antenna, and a waveguide array antenna.

11. A reflector antenna subsystem adapted to receive a monopulse tracking signal, comprising:

a primary reflector;

a feed device disposed on a surface of the primary reflector;

a sub-reflector coupled by one or more support arms to the primary reflector, such that the subreflector is suspended above the feed device; and a second antenna disposed on an outwardly facing surface of the sub-reflector, thereby orientated to receive the monopulse tracking signal.

* * * * *